(No Model.) 2 Sheets—Sheet 2.
A. EDWARDS & J. C. GARTEN.
CLOTH MEASURING MACHINE.
No. 577,161. Patented Feb. 16, 1897.
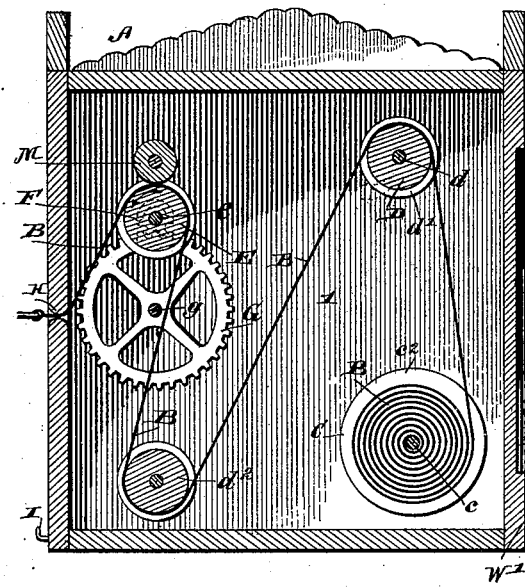
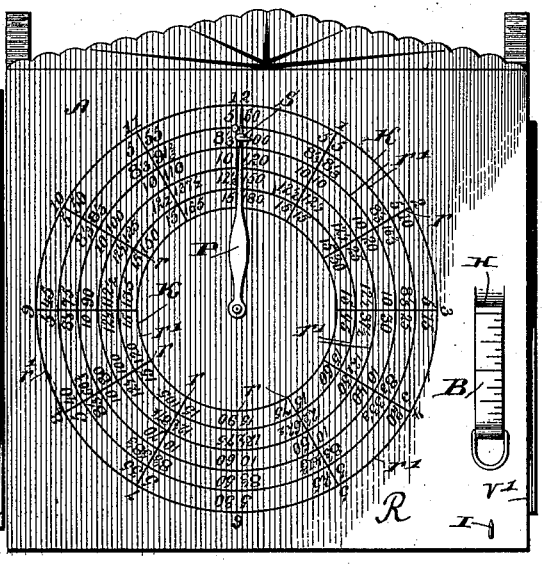
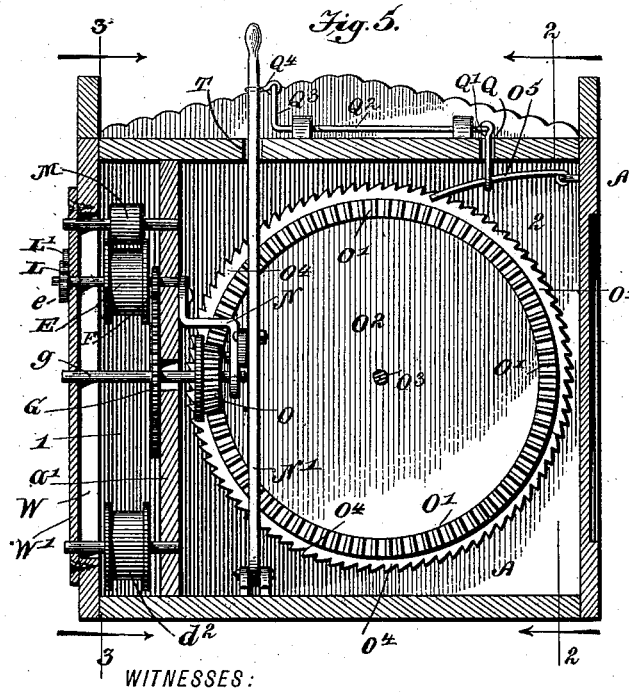
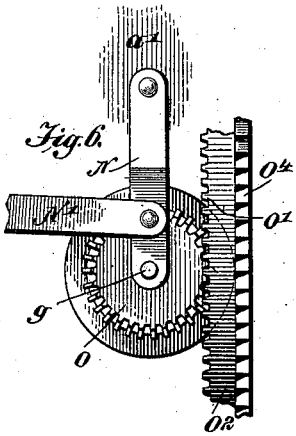
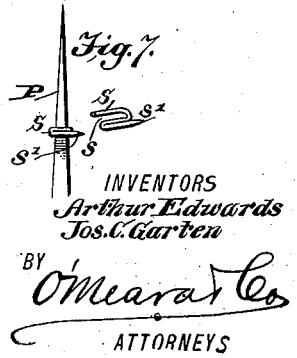
WITNESSES:
H. G. Dieterich
Chas. E. Brock
INVENTORS
Arthur Edwards
Jos. C. Garten
BY O'Meara & Co.
ATTORNEYS

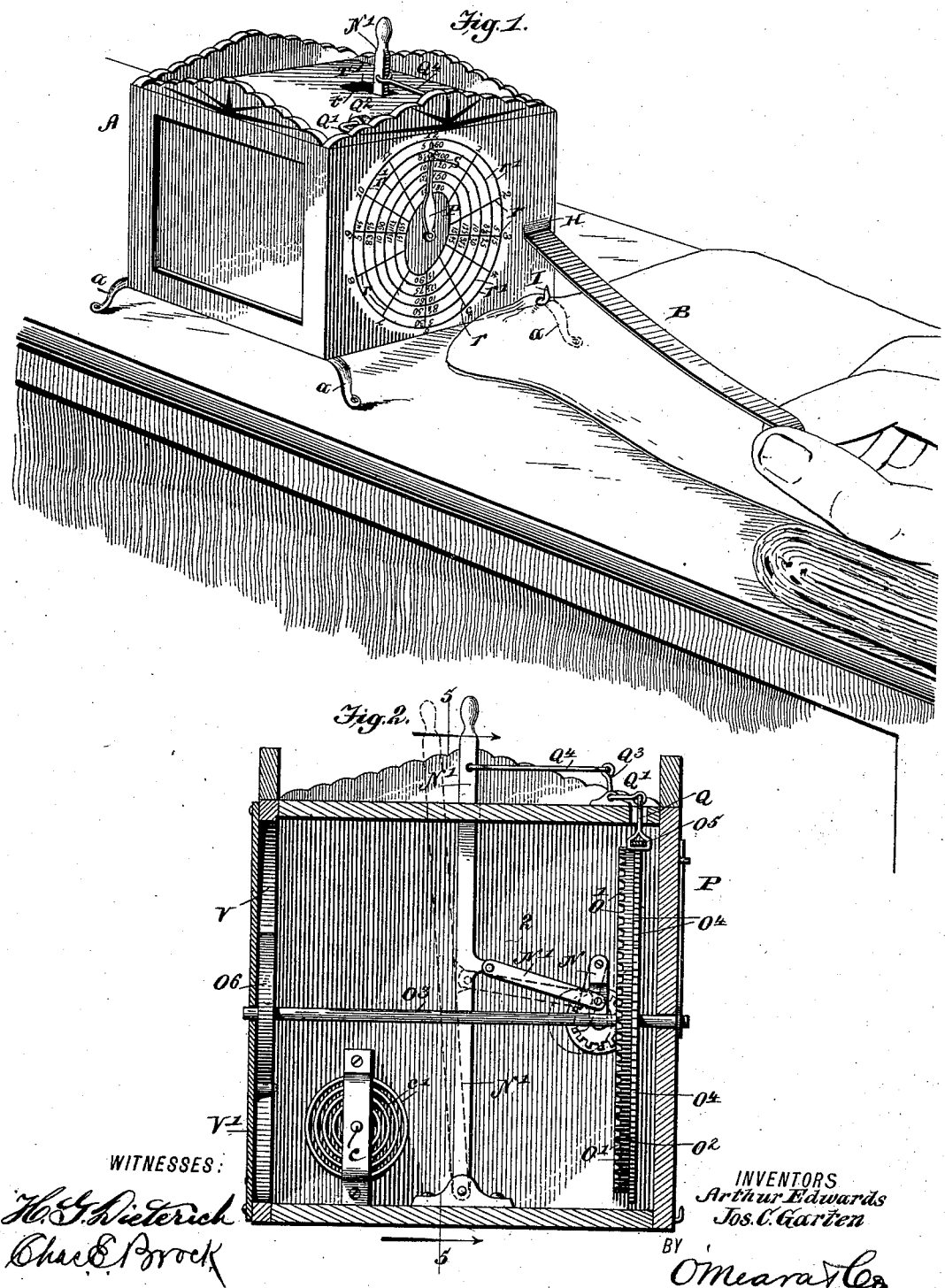

UNITED STATES PATENT OFFICE.

ARTHUR EDWARDS AND JOSEPH C. GARTEN, OF WILLOW SPRINGS, MISSOURI, ASSIGNORS OF THREE-FIFTHS TO SEBERN A. JONES, OF SAME PLACE.

CLOTH-MEASURING MACHINE.

SPECIFICATION forming part of Letters Patent No. 577,161, dated February 16, 1897.

Application filed March 19, 1896. Serial No. 583,941. (No model.)

*To all whom it may concern:*

Be it known that we, ARTHUR EDWARDS and JOSEPH C. GARTEN, residing at Willow Springs, in the county of Howell and State of Missouri, have invented an Improved Cloth-Measuring Machine, of which the following is a specification.

This invention is an improved measuring device or cloth-measure adapted for measuring cloth and similar goods, the object of the invention being to provide a simple contrivance which can be readily attached to the top of the counter upon which the goods are measured and sold.

Another object is to provide an indicator mechanism in connection with the measure, so that, if desired, the tape-measure can be dispensed with and the indicator used alone.

Another object is to provide a computer in connection with the indicator-dial whereby the price of any definite number of yards and the definite sum per yard can be immediately calculated or computed, thereby saving the clerk considerable time and trouble in figuring out the total amount, and this device has been found particularly convenient in large stores employing a number of clerks and selling goods at fractional prices, inasmuch as it saves the clerk the trouble of the multiplication of fractions, and by the use of this device a proprietor may employ a clerk who is a good salesman, but nothing of a mathematician, without the danger of having any mistakes made in the calculation of the price.

Another object is to provide a movable pointer in connection with the indicator-hand whereby the specific computation can be directly pointed out.

Another object is to provide a measure of the kind described in which the indicator mechanism can be thrown out whenever desired and the tape-measure used alone; and a still further object is to provide a cloth-measuring device in which the tape-measure and indicator will be held locked to show the exact measure and computation, and also means for returning all of said parts as soon as the lock is released.

With these objects in view our invention consists in the peculiar construction of the various parts, and also in their novel combination or arrangement, all of which are shown in the accompanying drawings, set forth in the description, and designated in the appended claims.

In the drawings forming a part of this specification, Figure 1 is a view showing our invention in use. Fig. 2 is a sectional view on the line 2 2 of Fig. 5. Fig. 3 is a vertical sectional view taken on the line 3 3 of Fig. 5. Fig. 4 is a face view. Fig. 5 is a vertical sectional view taken on the line 5 5 of Fig. 2, looking in the direction of the arrow. Fig. 6 is a detail view showing a portion of the mechanism for operating the indicator. Fig. 7 is a detail view of the indicator-hand and sliding pointer.

In the practical embodiment of our invention we employ a case, box, or frame A, supported upon suitable legs $a$, by means of which the device is screwed to the top of a counter or table.

The box or case A is divided into two compartments 1 and 2 by means of a vertical partition $a'$, the compartment 2 being considerably larger than the compartment 1, as clearly shown in the sectional view.

The tape-reeling mechanism is arranged in compartment 1 and the indicator mechanism is arranged in compartment 2, but it will be understood that the reeling and indicator mechanisms are so connected with each other that the operation of reeling off the tape-measure operates the indicator.

The tape B is wound upon a spool C, mounted upon a shaft $c$, which shaft is connected with a convolute spring $c'$, arranged upon the inner face of the partition $a'$, the purpose of said spring being to rewind the tape upon the spool after the measuring operation has been accomplished, and it will be observed that the spool C is provided with flanges $c^2$ in order to guide the tape as it is reeled and unreeled. The tape passes first over a tension-roller D, mounted upon shaft $d$, which shaft has its ends journaled in the partition $a'$ and sides of the box or case, and this roller, if desired, may be constructed with guide-flanges $d'$ to prevent the tape slipping therefrom. The tape then passes down around a tension and guide roller $d^2$, similar in all respects to the roller D, and after passing around said roller $d^2$ the tape passes over a roller E, journaled near the center of the side of case, said roller being mounted upon a shaft $e$, which also carries a pinion F, which pinion meshes with the gear G, mounted upon a shaft $g$, which shaft passes through the partition $a'$ and operates the indicator mechanism, as hereinafter described.

After passing over the roller E and operating the pinion F to drive the gear G the tape passes out through the opening H in the front side of box and can be reeled out the desired distance to measure the cloth arranged adjacent to the box or case, and in practice we prefer to arrange a hook I, to which the end of cloth to be measured can be attached, so as to prevent any slipping at that end.

After the end of cloth has been placed on the hook I the bolt of cloth can be rolled down the counter any desired distance, and then the tape-line reeled out, and in so measuring the cloth the salesman may look either to the figures on the tape-line, if there be any, or to the indicator-dial K, arranged upon the front face of the case.

The shaft $e$, carrying the roller E and pinion F, also carries a ratchet-disk L, upon the exterior of case, said disk being adapted to be engaged by a spring-actuated pawl L', pivoted also upon the side of case, said pawl permitting the disk to revolve in the direction indicated by the arrow while unreeling the tape-line, but the engagement of said pawl with the ratchet-disk will prevent any backward movement of the roller E, thereby holding the operative parts in a locked position, so as to clearly expose for any desired length of time the indicator hereinafter described. The tape-line, however, can be rewound, if so desired, but in case it is desired to also hold said tape in its unreeled position we may accomplish the same by arranging a pressure-roller M directly above the roller E, the purpose of said roller being to hold the tape-line between the rolls E and M, and inasmuch as the roll E is locked against rearward movement the tape-line will be held between said rolls.

When it is desired to return the parts to their normal position, the lock-pawl L' is lifted out of engagement with the ratchet-disk, and the spring of the tape-reel and that of the indicator mechanism will return all of the parts to their normal position.

The reeling mechanism having now been described, we will proceed to describe the indicator mechanism, and it will be remembered that the shaft $g$, upon which the gear G is mounted, projects through the vertical partition $a'$ into the compartment 2, which contains the indicator mechanism. The inner end of this shaft $g$ rests in a bracket N, which bracket is pivoted to the partition $a'$, as clearly shown, and connected with said bracket is a shifting lever N', by means of which said bracket and likewise the shaft is moved backward and forward, as indicated in dotted lines.

Mounted upon the inner end of the shaft $g$ is a gear or pinion O, which gear or pinion meshes with the crown-teeth O', arranged upon the inner face of a circular disk $O^2$, said disk being rigidly mounted upon a shaft $O^3$, journaled in the front and rear sides of the case, the forward end of said shaft projecting through the front face of case and carrying the indicator-hand P. The periphery of the disk $O^2$ is provided with a series of ratchet-teeth $O^4$, adapted to engage the locking-pawl $O^5$, secured inside of case, thereby locking said disk against rearward movement.

A convolute spring $O^6$ is attached to the inner end of the shaft $O^3$ for the purpose of returning the indicator-hand to its normal position after the operating mechanisms have been released.

The locking-pawl $O^5$ is lifted out of engagement from the ratchet-teeth of the disk by means of a link Q, connected to the angled end Q' of a rock-shaft $Q^2$, the opposite angled end $Q^3$ being connected with the lever N by means of a link $Q^4$, so that when the gear or pinion O is thrown out of engagement with the crown-teeth of the disk the locking-pawl will also be lifted out of engagement with the ratchet-teeth on said disk.

The dial R is preferably made of celluloid or other suitable material, circular in form, and is divided according to the number of yards the device is intended to measure, in the present instance said dial being divided into twelve parts, the apparatus being capable of measuring twelve yards. The dial is divided by the radial lines $r$, and at the outer end of each radial line is arranged a numeral "1," "2," "3," &c., according to the position it occupies.

In addition to the radial lines above referred to the dial-plate has a series of concentric circles $r'$, and arranged within said circles upon the left-hand side of the radial line are the figures indicating the price per yard, as "5," "8¼," "10," "12½," "15," &c., and upon the right-hand side of the radial line is arranged the product of the price per yard by the number of yards indicated at the end of the radial line. Thus for three yards in the first circle is arranged "15," the second "25," the third "30," the fourth "37½," and the fifth "45," and so on. Thus for three yards of cloth at twelve and one-half cents per yard the product will be indicated in the fourth circle upon the right-hand side of the radial line "3," and in addition to the indicator-hand which moves around opposite the radial line we provide a movable pointer S, which slides upon the indicator-hand opposite any desired circle, so that when the indicator-hand moves around opposite the radial line the movable pointer will rest within the concentric circle opposite the product or total price of the purchase. This pointer S consists simply of a piece of wire bent upon itself to form a spring-clip s, adapted to point upon the indicator-hand, and the finger or pointer member s', which points directly to the product or total cost.

The upper end of the lever N projects through a slot T in the top of the case, said slot having a shoulder t, back of which the lever can be locked out of engagement, and the shaft $Q^2$ is also journaled upon the top of the case, as clearly shown.

Now in operation whenever it is desired to measure a piece of cloth the end of said cloth is hooked upon I, as before described, and the bolt of cloth rolled along the counter or table. The tape-line is then pulled out by hand through the opening H until the desired number of yards has been indicated upon the dial, and as the price-pointer S has been adjusted along the indicator-hand previous to the measurement said pointer will show the total amount of the purchase, thus saving the trouble of multiplying the price per yard by the number of yards. The locking-pawl $O^5$ will serve to lock the indicator mechanism, and likewise the reeling mechanism; but in case it is desired to use said reeling mechanism independent of the indicator mechanism we also employ a pawl-and-ratchet mechanism L and L' upon the shaft E.

In case the reeling and indicating mechanisms are used together, the pawl and ratchet L and L' can be dispensed with and the pawl $O^5$ alone used to lock the parts against reverse movement, and whenever it is desired to return the parts to their normal position it is only necessary to throw the upper end of the lever end rearward, thus throwing the shaft g rearward and lifting the end of pawl $O^5$. This releases all of the parts, and the convolute springs upon the indicator-shaft and tape-reel shaft return all of the parts to their normal position.

In order to provide for the insertion of the various parts into the case, we cut away the side, as at V, and cover the same with a plate V', and at the rear we cut the side away, as shown at W, and cover said opening by the plate W'. Thus whenever it is desired to arrange or repair the indicator mechanism we simply remove the plate V, and in order to arrange or repair the reeling mechanism it is only necessary to remove the back plate W', said openings V and W being made sufficiently large to enable one to have free access to all of the operative parts.

Having thus described our invention, what we claim as new, and desire to secure by Letters Patent, is—

1. In a cloth-measuring device of the kind described, the combination with the tape-reel and tension-rollers of the gear and pinion operated by one of said rollers, the crown-gear and pinion, the shifting lever all arranged, substantially as shown and described.

2. In a cloth-measuring device, the combination with the disk having crown-teeth upon its inner face and rigid teeth on the periphery, of the locking-pawl adapted to engage the rigid teeth on the periphery, the spring-actuated shaft upon which said disk is mounted, the indicator-hand upon the outer end of said shaft, the shifting lever, the rock-shaft and link connections, the movable shaft and gears connected therewith, and the tape-reeling mechanism operatively connected with the gear upon the outer end of said movable shaft, substantially as shown and described.

3. The combination with the shifting lever of the movable shaft carrying a gear or pinion upon its inner end, and disk having crown and rigid teeth, and locking-pawl adapted to engage the rigid teeth, the rock-shaft having angled ends and the links connecting said shaft with the shifting lever, and the locking-pawl, substantially as shown and described.

ARTHUR EDWARDS.
JOS. C. GARTEN.

Witnesses:
W. V. EDWARDS,
R. F. MOFFITT.